United States Patent [19]
Warren

[11] Patent Number: 5,960,689
[45] Date of Patent: Oct. 5, 1999

[54] BAR PULLER

[75] Inventor: Malcolm Warren, Corfu, N.Y.

[73] Assignee: Warren Metallurgical Inc., Corfu, N.Y.

[21] Appl. No.: 09/179,625

[22] Filed: Oct. 27, 1998

[51] Int. Cl.⁶ .................................................. B23B 13/12
[52] U.S. Cl. .............................. 82/127; 82/162; 82/903; 414/14
[58] Field of Search ............................. 82/127, 126, 124, 82/150, 151, 162, 903; 414/14, 17, 18

[56] References Cited

U.S. PATENT DOCUMENTS

| | | | |
|---|---|---|---|
| 1,961,091 | 5/1934 | Smith et al. ............................... | 82/162 |
| 5,165,313 | 11/1992 | Karr .......................................... | 82/127 |
| 5,481,951 | 1/1996 | Kiefer ........................................ | 82/162 |

FOREIGN PATENT DOCUMENTS

| | | | |
|---|---|---|---|
| 1030134 | 7/1983 | U.S.S.R. ................................... | 82/162 |
| 1211014 | 2/1986 | U.S.S.R. ................................... | 82/162 |

*Primary Examiner*—Andrea L. Pitts
*Assistant Examiner*—Henry W. H. Tsai
*Attorney, Agent, or Firm*—Howard J. Greenwald

[57] ABSTRACT

An apparatus for gripping a bar supported for rotation by a numerically controlled lathe. The apparatus contains two jaws and a gripper cam pivotally attached to each jaw; springs attached to the jaws tend to rotate the gripper cams away from the jaws. A device is provided for moving the jaws together, moving the jaws apart, and locking the jaws into a fixed position.

9 Claims, 7 Drawing Sheets

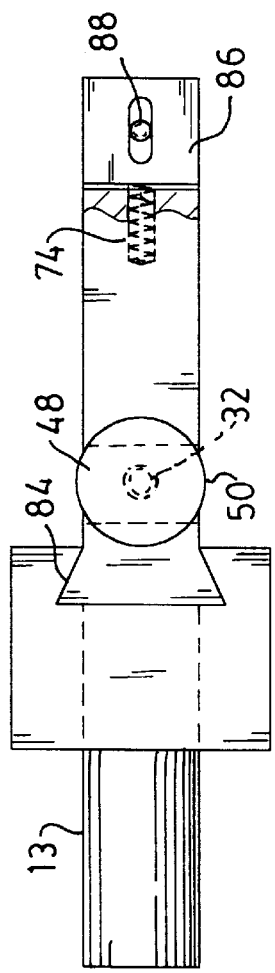
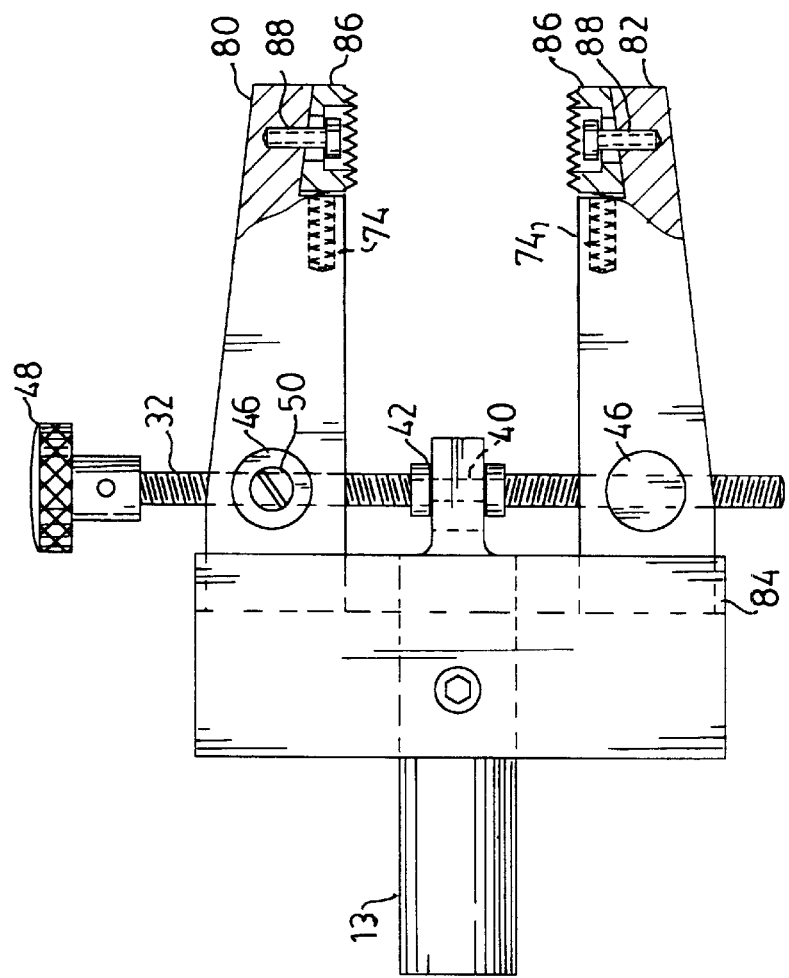

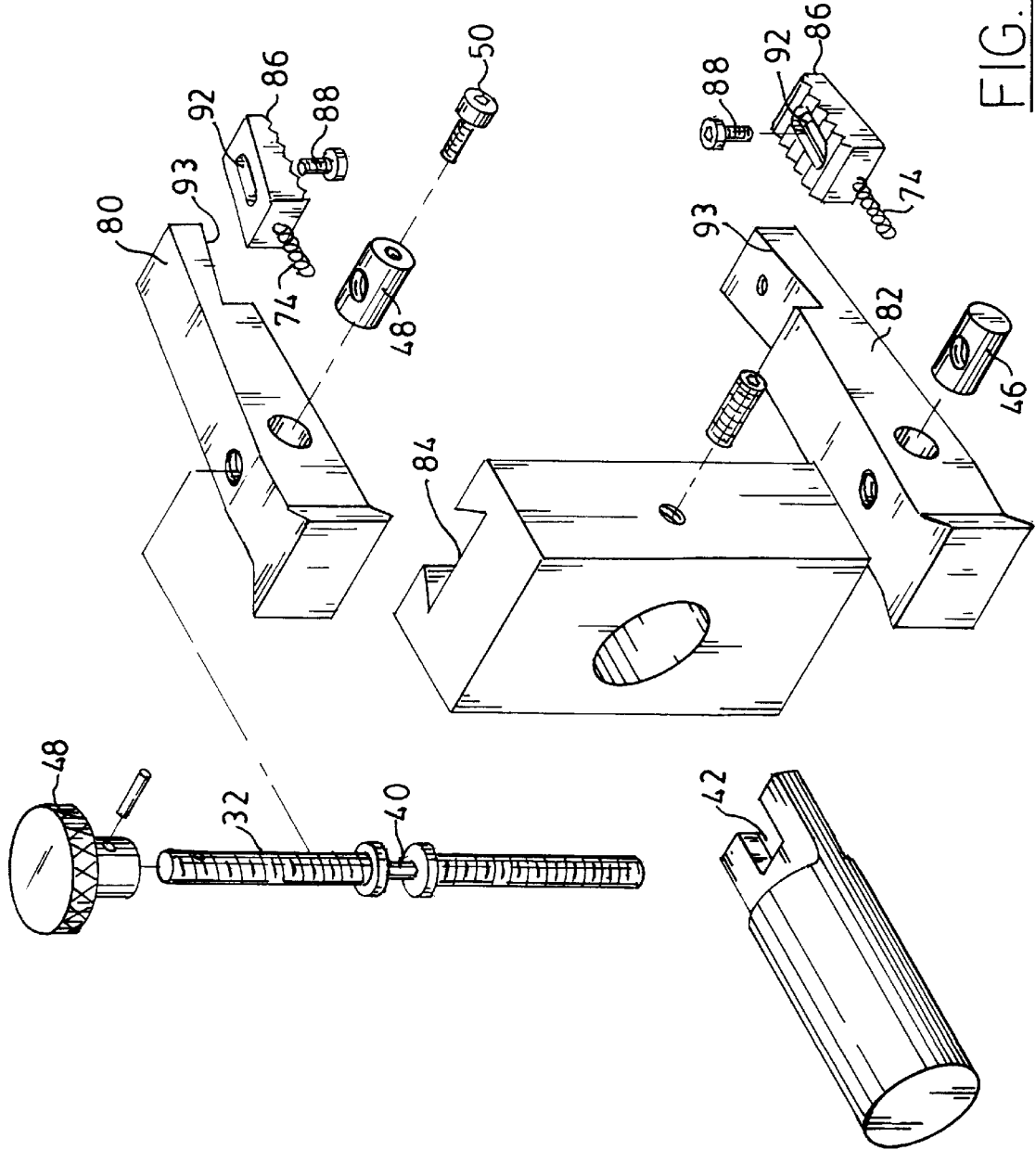

BAR PULLER

FIELD OF THE INVENTION

A bar puller with adjustable jaws employing several cam mechanisms.

BACKGROUND OF THE INVENTION

U.S. Pat. No. 4,924,738 of Hue N. Che disloses a bar puller having adjustable jaws which comprise fingers made of a resilient material; a similar device is also disclosed in U.S. Pat. No. 5,046,226 of Hue N. Che. The fingers of the Che device, which are resilient spring arms, extend forward from a housing adapted to be mounted at a tool station of a computer numerically controlled lathe having a turret.

The device of the Che patent must be engaged by pushing it onto the end of a bar with a substantial amount of force; and a substantial amount of pressure is also required to disengage the bar from the Che device. Although this is not a problem with the relatively large numerically controlled lathes used in prior years, the newer CNC lathes are substantially smaller and less tolerant of repeated applications of such force.

Furthermore, in spite of the multiplicity of fingers used in the device of the Che patent, the gripping force of such device depends upon the amount of spring pressure in the resilient arms of the device which, in most applications, is limited to a relatively low pressure.

It is an object of this invention to provide a bar puller which can be engaged and disengaged with only a minimal amount of force and which exerts a gripping force substantially greater than the gripping forces previously available.

SUMMARY OF THE INVENTION

In accordance with this invention, there is provided a bar puller for a bar supported for rotation by a numerically controlled lathe having a plurality of tool stations, the tool stations being movable along and transverse to the rotational axis of the bar. The bar puller is comprised of a housing, having a long axis, adapted to be mounted at the tool station. The bar puller also contains at least two jaws and, pivotally connected to each of said jaws, a cam gripper. Means for adjusting the distance between such jaws also are provided.

BRIEF DESCRIPTION OF THE DRAWINGS

The claimed invention will be described by reference to the specification and to the enclosed drawings, in which like numerals refer to like elements, and in which:

FIG. 6 is a side view of another gripper means which may be used in the bar puller of the invention;

FIG. 7 is a top view of the gripper means of FIG. 6;

FIG. 8 is an exploded view of the gripper means of FIG. 6;

DESCRIPTION OF THE PREFERRED EMBODIMENTS

U.S. Pat. Nos. 4,924,738 and 5,046,226 of Hue No. Che each describe a bar puller with an adjustable jaw opening. Other bar pullers are described in U.S. Pat. Nos. 4,211,123 of James F. Mack, 4,321,845 of Tibor Szabo et al., 4,464,958 of Charles J. Luks, 4,522,091 of Joseph F. Toffolon, 4,580, 470 of James R. Buck, 4,596,168 of James R. Buck, 4,617, 847 of Kurt Schaldach, 4,754,671 of Joseph F. Toffolon, 5,165,313 of Robert Karr, and the like. The disclosure of each of these United States patents is hereby incorporated by reference into this specification.

The bar puller of this invention, like the bar puller of many of the prior art patents, is adapted for use with a bar supported for rotation by a numerically controlled lathe having a plurality of tool stations, wherein the tool stations are movable along and transverse to the rotational axis of the bar. See, e.g., the Figures of U.S. Pat. No. 4,924,738 and the description corresponding to them.

Figure 1:
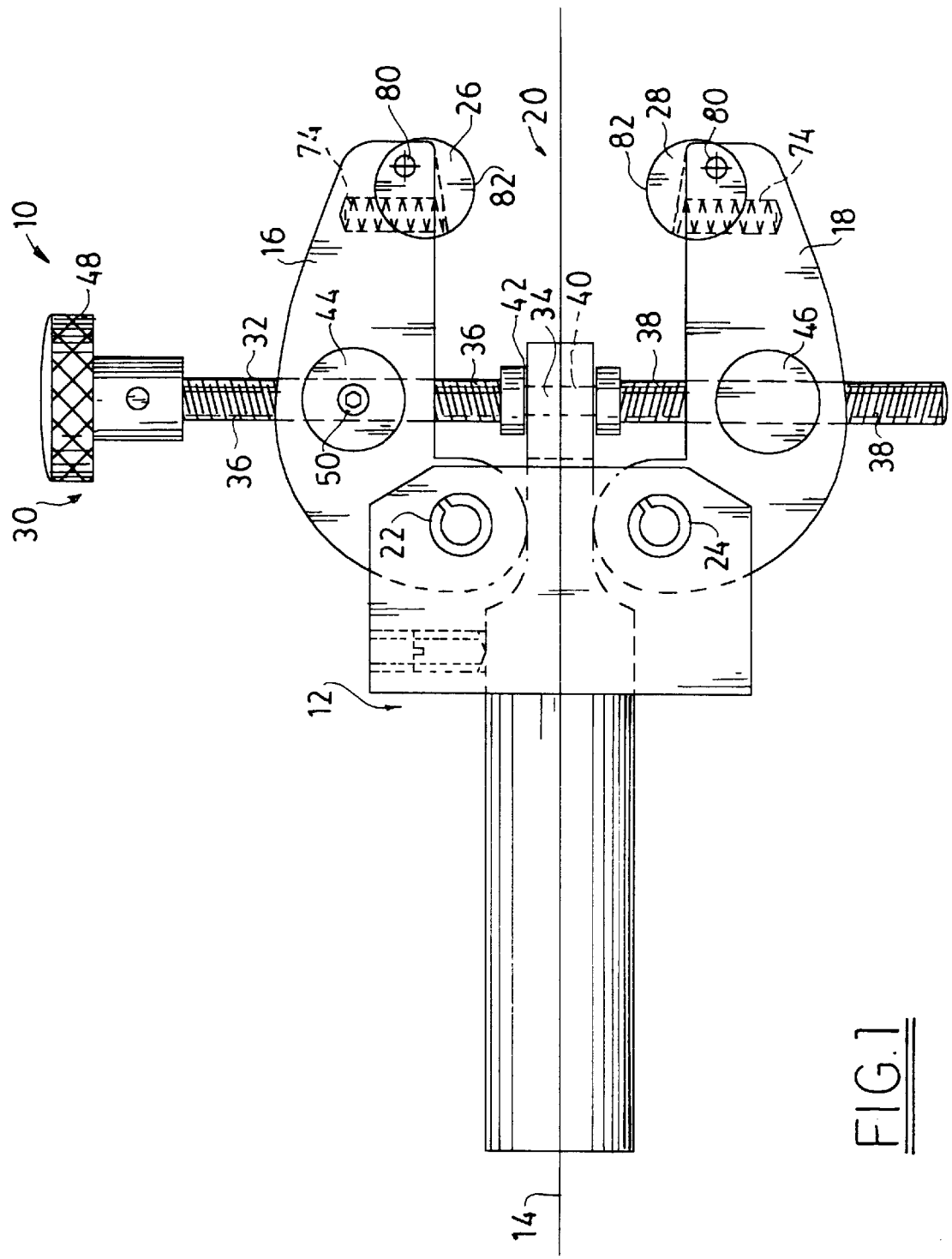
FIG. 1 is a side view of one preferred embodiment of the invention.

FIG. 1 is a side view of one preferred bar puller 10 of the invention. Referring to FIG. 1, and to the preferred embodiment depicted therein, it will be seen that bar puller 10 is comprised of a housing 12 having a long axis 14 adapted to be mounted at a tool station.

The bar puller 10 is also comprised of at least two jaws 16 and 18 adapted to be pivotally mounted on the housing 12 which define a jaw opening 20. In the preferred emobdiments depicted in FIGS. 1 and 2, the jaws 16 and 18 are mounted by means of pivot pins 22 and 24.

Each of the jaws 16 and 18 has pivotally attached thereto a cam gripper, such as, e.g., cam gripper 26, and cam gripper 28. These cam grippers will be described in greater detail elsewhere in this specification.

Referring to FIG. 1, and in the preferred embodiment depicted therein, the bar puller 10 also is comprised of means 30 for adjusting the jaws 16 and 18 to a position wherein the cam grippers 26 and 28 are disposed in a spaced apart relation to each other a distance slightly smaller than the maximum dimension of the bar (not shown) so that the cam grippers receive and grip and end portion of the bar when the bar is inserted therebetween. In the embodiment depicted in FIG. 1, such adjustment means 30 is comprised of a threaded rod 32 comprised of an annular groove 34 disposed within a slot 42 and adapted to move the cam grippers 26 and 28 towards and away from axis 14 and to maintain said cam grippers substantially equidistant from such axis.

Referring again to FIG. 1, it will be seen that the threads on portion 36 of rod 32 are left hand threads, whereas the threads on portion 38 of rod 32 are right hand threads. The intermediate portion 40 of rod 32 is preferably unthreaded but rides up and down in slot 42. Brass pivot nuts 44 and 46 engage the left and right handed threads, respectively so that, adjustment knob is rotated clockwise, the jaws 16 and 18 are pulled towards each other, whereas when the adjustment knob 48 is rotated counterclockwise, the jaws 16 and 18 are opened. Similarly, the clockwise movement of the adjustment knob 48 causes the unthreaded portion 40 of rod 32 to rise within slot 42, whereas the counterclockwise movement of such knob 48 causes the unthreaded portion 40 of rod 32 to fall within slot 42.

In summary, the mechanism depicted in FIG. 1 provides adjustably moving jaws 16 and 18 towards each other, or away from each other. Furthermore, it also provides means for locking jaws 16 and 18 in any particular position. Referring again to FIG. 1, it will be seen that locking screw 50 can be tightened downwardly onto rod 32 to lock such rod in any particular position. Although not shown in FIG. 1, a similar locking screw could be used with pivot nut 46.

Figure 2:
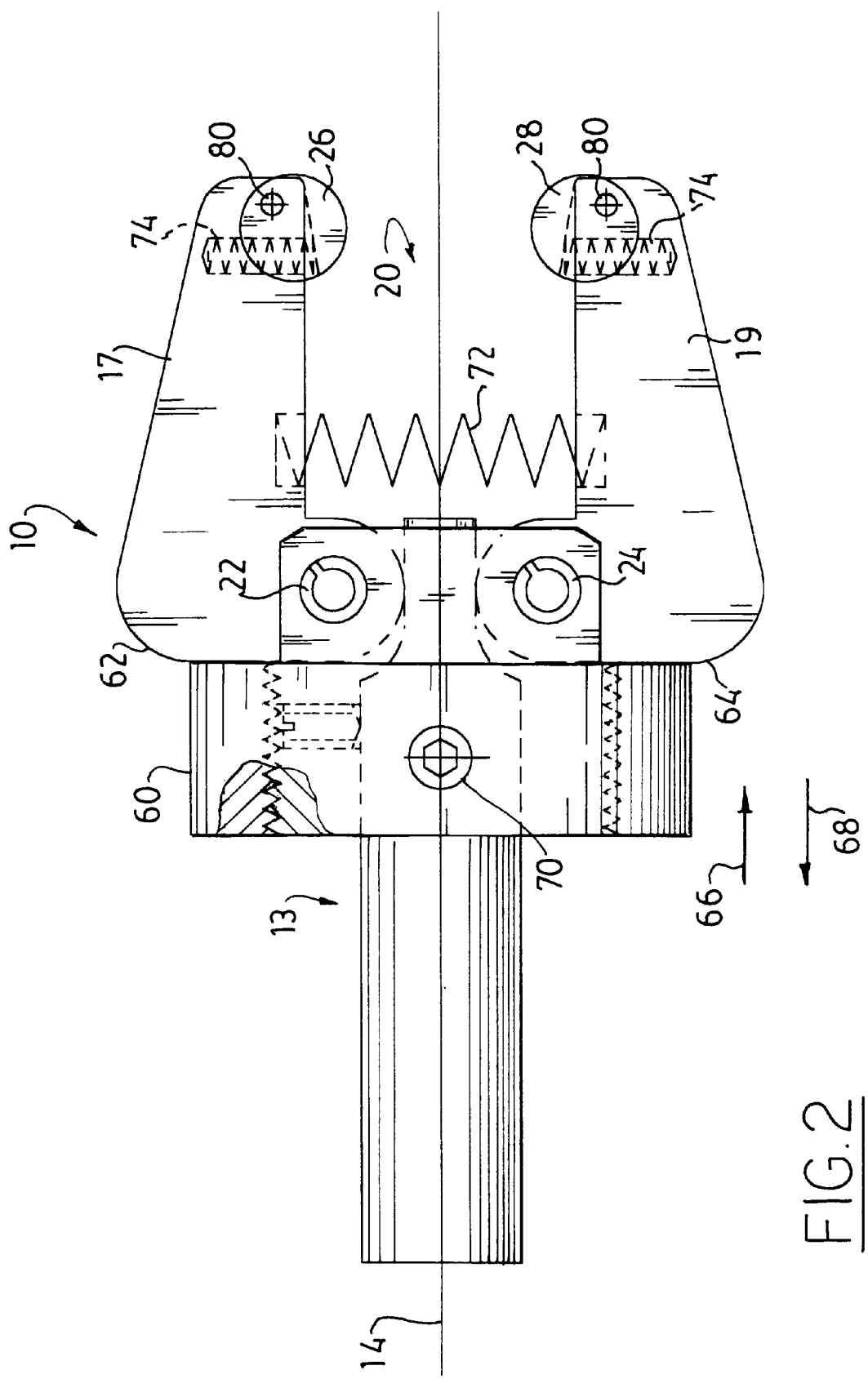
FIG. 2 is a side view of another preferred embodiment of the invention.
Figure 4:
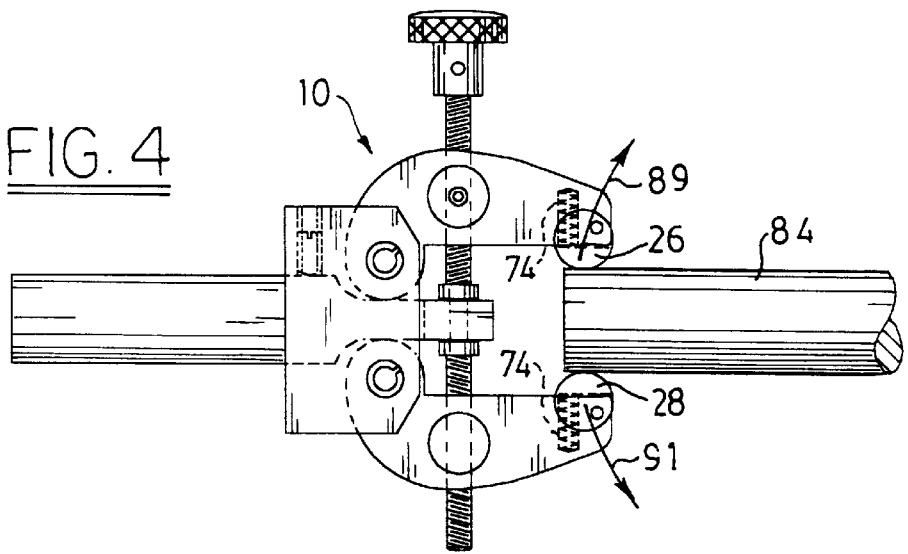
FIG. 4 is a side view of the embodiment of FIG. 1, illustrating the position of the gripper cams after a bar ha s been inserted between such cams.

FIG. 4 is a side view of an embodiment which is functionally similar to the device of FIG. 1 but uses a different mechanism. Referring to FIG. 2, it will be seen that a rotatable threaded collar 60 is screwably connected to a threaded body 13 and is contiguous with the bottom walls of jaws 17 and 19. As the threaded collar 60 is screwed in the direction of arrow 66, it causes jaws 17 and 19 to move towards each other; conversely, the jaws 17 and 19 are separated as the threaded collar is screwed in the direction of arrow 68. Set screw 70 allows one to lock collar 60 into any desired position. Spring 72 operates to keep jaws 17 and 19 apart from each other.

Referring again to FIG. 1, it will be seen that each of the cam grippers 26 and 28 is comprised of a springs 74, each of which is disposed within a recess 76 (see FIG. 6) and abuts a flat surface 78 (see FIG. 6) of each of cam grippers 26 and 28. As will be apparent to those skilled in the art, springs 74 urge cam grippers 26 and 28 towards each other, but each of them are restrained by pivot pins 80 (also see FIG. 6).

The outer surfaces 82 of cam grippers 26 and 28 may be smooth. Alternatively, or additionally at least in part, they may have milled surfaces 84 (see FIG. 6), and/or one or more elastomeric coatings, and/or one or more abrasive coatings, and the like.

Figure 3:
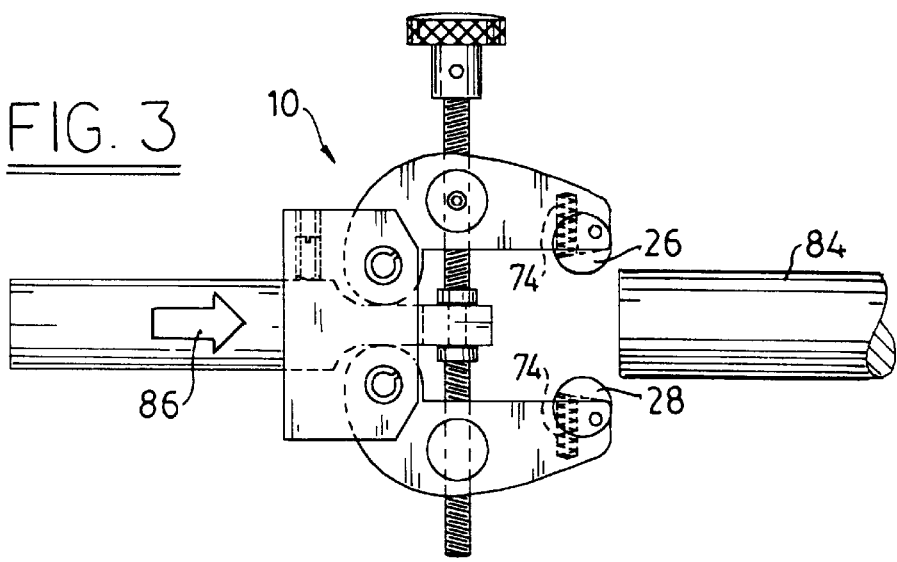
FIG. 3 is a side view of the embodiment of FIG. 1 illustrating the position of the gripper cams just prior to the time a bar is inserted between such cams.

FIG. 3 illustrates how the cam grippers 26 and 28 cooperate to engage a bar 84. In the position depicted in FIG. 3, the bar puller 10 is being moved in the direction of arrow 86, but the cam grippers 26 and 28 have not yet contacted bar 84.

FIG. 4 illustrates the position of cam grippers 26 and 28 after bar 84 has been pushed between such cam grippers 26 and 28 and caused them to move rotatably outwardly in the direction of arrows 89 and 91. It will be noted that springs 74 are compressed in this position.

Figure 5:
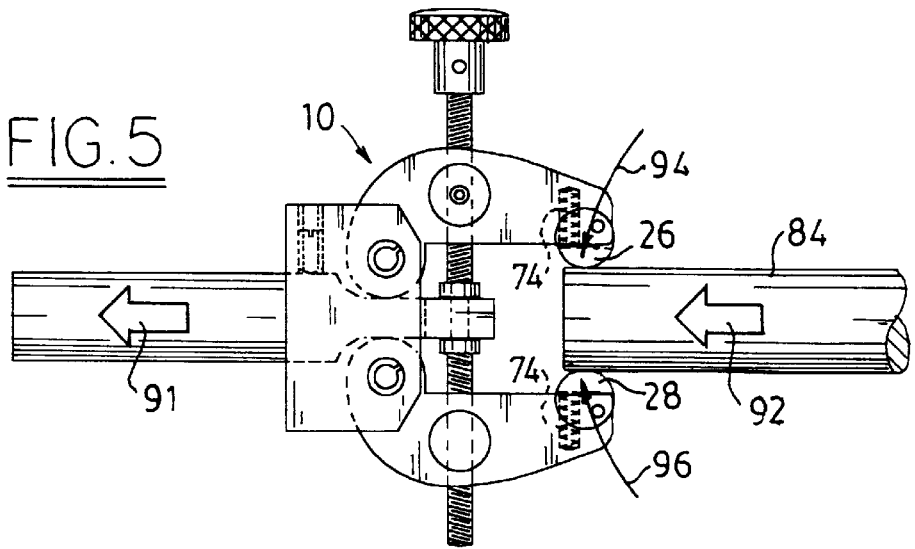
FIG. 5 is a side view of the embodiment of FIG. 1, illustrating the position of the gripper cams as the bar is being withdrawn from the lathe.

FIG. 5 illustrates the position of cam grippers 26 and 28 when the body 12 is pulled in the direction of arrow 90, thereby causing gripper cams 26 and 28 to rotate inwardly in the direction of arrows 94 and 96, respectively, and also causing bar 84 to move in the direction of arrow 92. It will be noted that, in this position, the springs 74 have expanded slightly.

The mechanism depicted in FIGS. 1–5 will withstand at least about a 200 pound linear force, and it operates by a rotatably gripper mechanism. Other movable gripper mechanisms also may be used, such as slidable gripper mechanisms.

One such other movable gripper mechanism is illustrated in FIG. 6. Referring to FIG. 6, it will be seen that arms 80 and 82 are slidably disposed within a dovetailed slot 84 and can be moved towards or away from each other by means of threaded rod 32. It will be seen that wedge-shaped jaws 86 are urged forwardly by springs 74 disposed with orifices (also see FIG. 8).

Referring to FIG. 8, it will be seen that screws 88 slidably connect jaws 86 to arms 80 and 82; although the screws 88 are fixed into position vis-a-vis inclined planes 93, because of the presence of slots 92 the jaws 86 are free to move in a diagonal position.

Figure 9:
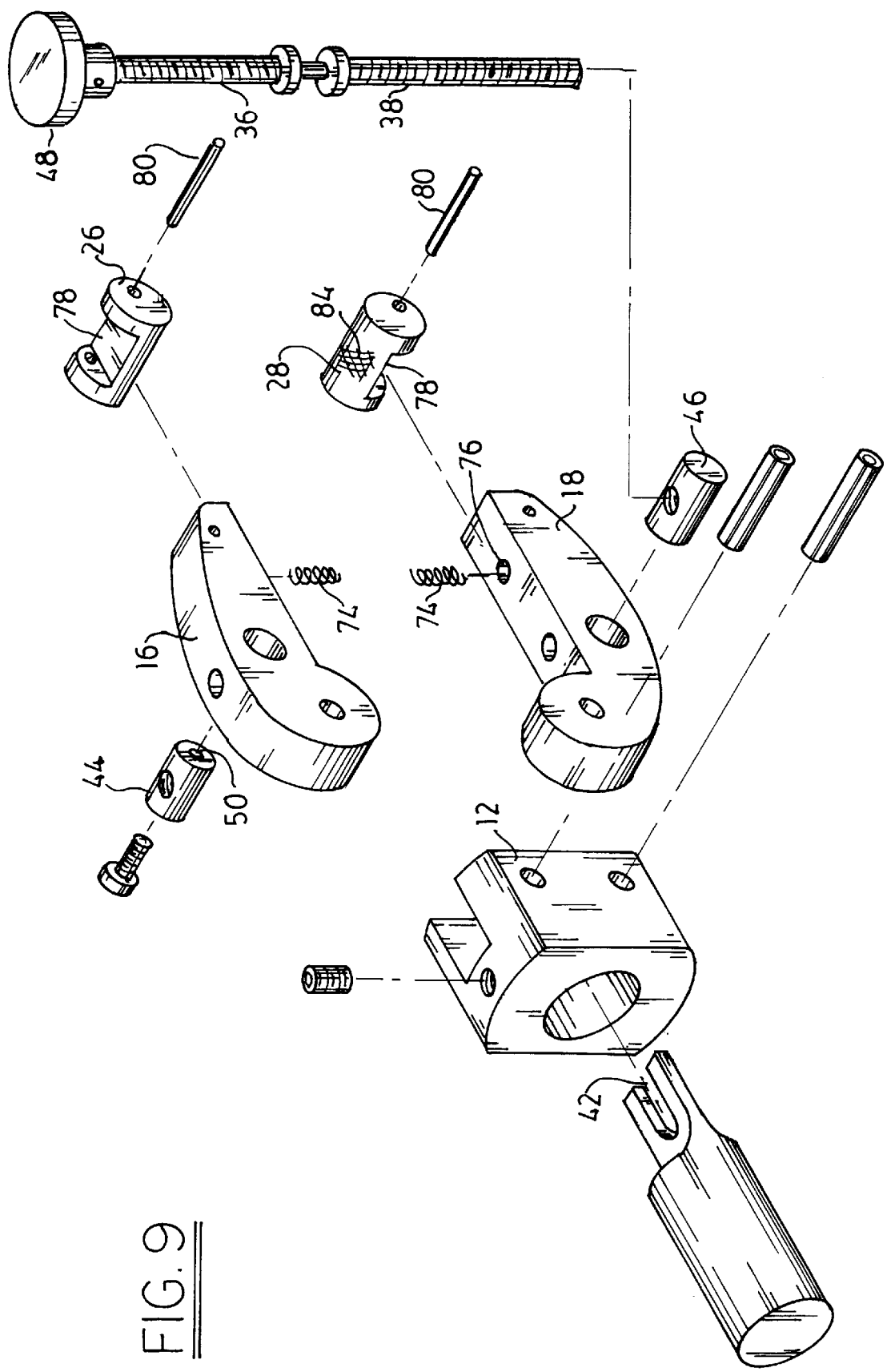
FIG. 9 is an exploded view of the embodiment of FIG. 1.

FIG. 9 is an exploded view of the embodiment of FIG. 1.

Figure 10:
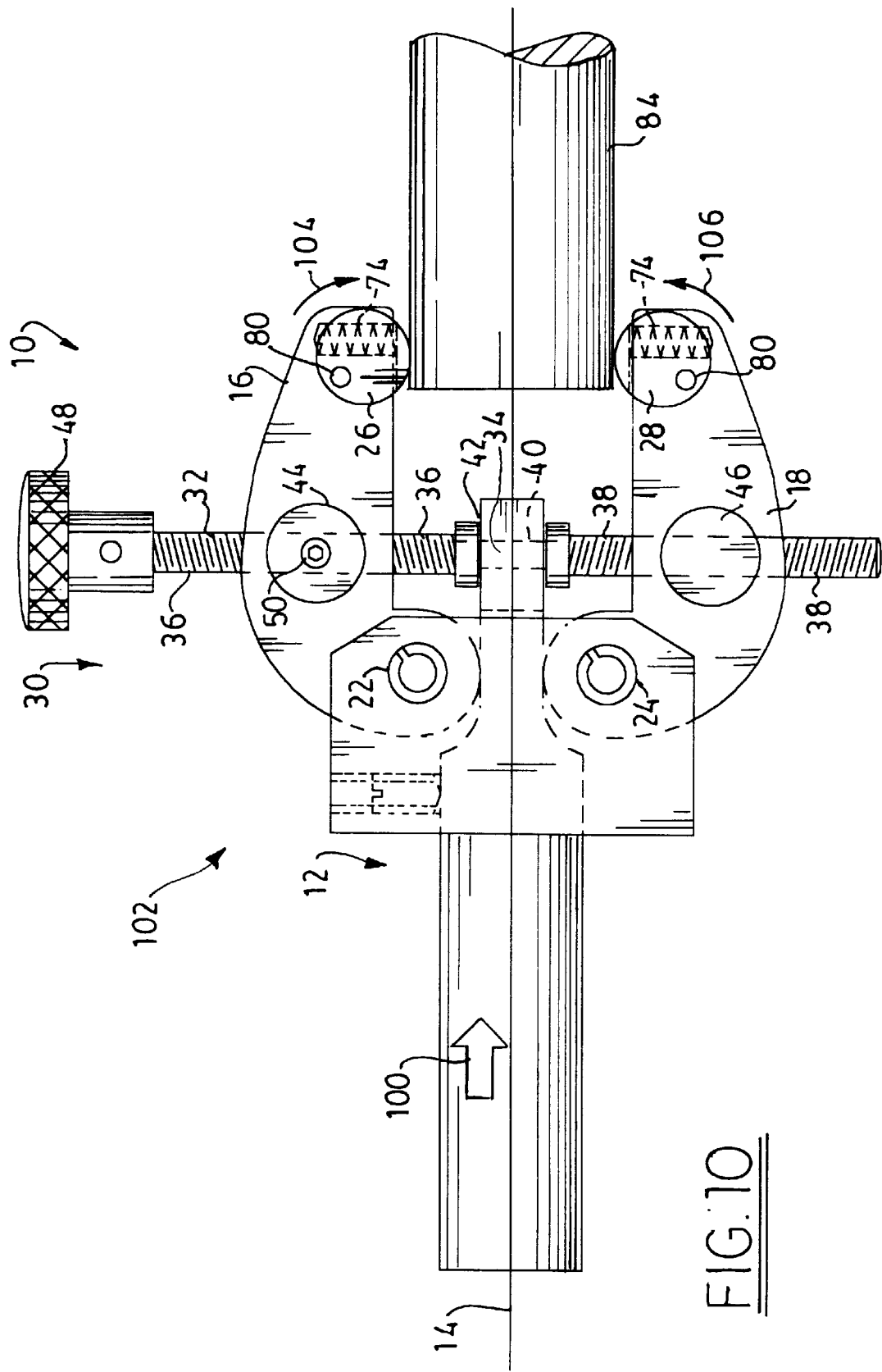
FIG. 10 is a side view of a preferred embodiment of a bar pusher.

FIG. 10 is a side view of a preferred bar pusher of this invention which is similar in many respects to the embodiment depicted in FIG. 1 but differs therefrom in that the cams 26 and 28 have been rotated 180 degrees so that their pivot pins 80 are disposed 180 degrees away from the positions depicted in FIG. 1. Thus, when the bar pusher 102 is pushed in the direction of arrow 100, the cam grippers 26 and 28 move in the directions of arrows 104 and 106, respectively, thus gripping bar 84 and applying force thereto. As will be apparent, the bar 84 may be released by pulling assembly 102 in a direction opposite to that indicated by arrow 100.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. An apparatus for gripping a bar supported for rotation by a numerically controlled lathe having a plurality of tool stations, the tool stations being movable along and transverse to the rotational axis of the bar, wherein said apparatus comprises:

(a) a housing having a long axis, adapted to be mounted at a tool station;

(b) a first jaw and a second jaw, a first gripper cam pivotally attached to said first jaw by means of a first pivot pin, a second gripper cam pivotally attached to said second jaw by means of a second pivot pin, first spring means contiguous with said first jaw and said first gripper cam for rotating said first gripper cam away from said first jaw, and resilient means contiguous with said second jaw for rotating said gripper cam away from said second jaw, (c) means for moving said first jaw and said second jaw towards each other, (d) means for moving said first jaw and said second jaw away from each other, and (e) means for locking said first jaw and said second jaw in a fixed position with regard to each other.

2. The apparatus as recited in claim 1, wherein said resilient means is a second spring.

3. The apparatus as recited in claim 2, comprising means for compressing said first spring and said second spring when said bar is contacted with said first gripper cam and said second gripper cam.

4. The apparatus as recited in claim 2, comprising means for expanding said first spring and said second spring when said bar is contacted with said first gripper cam and said second gripper cam.

5. The apparatus as recited in claim 3, wherein said means for moving said first jaw and said second jaw towards each other comprises a threaded rod with a first threaded portion, an intermediate portion, and a second threaded portion, wherein said first threaded portion contains left handed threads, said intermediate portion is unthreaded, and said second threaded portion contains right handed threads.

6. The apparatus as recited in claim 5, wherein said means for locking said first jaw and said second jaw comprises a set screw.

7. The apparatus as recited in claim 3, wherein said means for moving said first jaw and said second jaw towards each other comprises a threaded sleeve.

8. The apparatus as recited in claim 7, wherein said threaded sleeve is contiguous with said first jaw and said second jaw.

9. The apparatus as recited in claim 8, further comprising a spring disposed between said first jaw and said second jaw.

\* \* \* \* \*